March 25, 1941. A. R. ALLARD 2,236,256
APPARATUS FOR FINISHING GEAR TEETH
Filed Dec. 13, 1938 2 Sheets-Sheet 1

INVENTOR
ARTHUR R. ALLARD.
BY
ATTORNEY

Patented Mar. 25, 1941

2,236,256

UNITED STATES PATENT OFFICE 2,236,256

APPARATUS FOR FINISHING GEAR TEETH

Arthur R. Allard, Drexel Hill, Pa., assignor to Westinghouse Electric & Manufacturing Company, East Pittsburgh, Pa., a corporation of Pennsylvania Application December 13, 1938, Serial No. 245,491

10 Claims. (Cl. 29—90)

My invention relates to gear manufacture and it has for an object the provision of apparatus for burnishing the faces of gear teeth.

In the manufacture of reduction gearing for the transmission of large powers, for example, marine reduction gearing, it is desirable to provide teeth having faces which are both hard and smooth in order to minimize pitting and to reduce wear. Furthermore, burnishing provides for cold working or hardening of the gear faces with the result that, even though the steel gear is as hard as practicable for finish cutting or hobbing, the tooth faces may have further hardening imparted thereto. While a pair of gears may have the teeth thereof burnished by the application of power to one and of a load or resistance to the other, the power required may be substantially reduced, or the unit pressure increased, or both, by the use of a narrow burnishing pinion; and further reduction in power may be had if the energy represented by the load or resistance is not dissipated, that is, if the required burnishing pressure is secured with an arrangement effective to secure opposed torque relation of gear members sufficient to provide the required burnishing pressure while at the same time requiring a minimum of power for turning the gears. Accordingly, a further object of my invention is to provide a machine arranged to support a pair of gears in meshing relation with respect to one or more narrow burnishing pinions, the machine including apparatus for effecting rotation of the gears and of the pinion and including means providing for gear torques effective in such directions that burnishing pressure of the pinion and the gear teeth may be secured, the burnishing pinion being traversed for the full length of the gear teeth in order that the faces of the latter may be burnished from end to end.

These and other objects are effected by my invention as will be apparent from the following description and claims taken in connection with the accompanying drawings forming a part of this application, in which:

Figure 1:
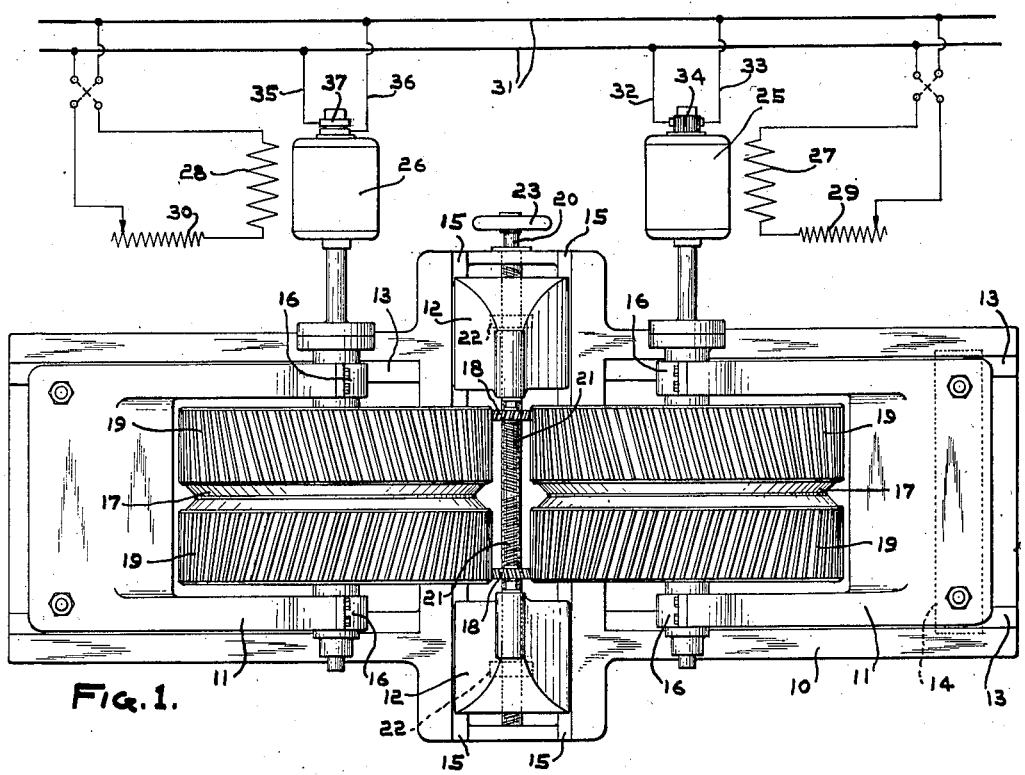
Fig. 1 is a plan view showing one embodiment of the improved burnishing apparatus.
Figure 2:
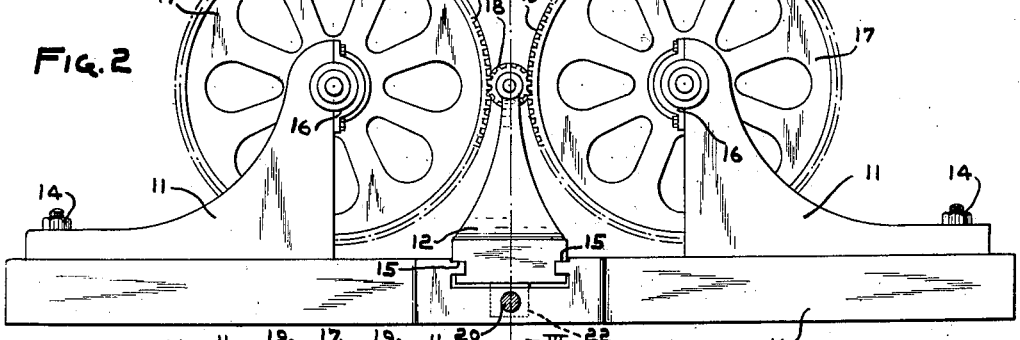
Fig. 2 is an end elevation of apparatus shown in Fig. 1.
Figure 3:
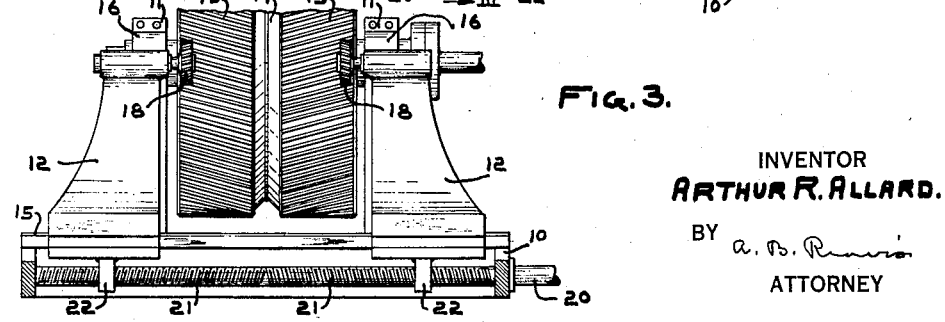
Fig. 3 is a detail view taken along the line III—III of Fig. 2.

Referring now to the drawings more in detail, in Figs. 1, 2, 3 and 4 there is shown a frame comprising a bedplate 10 carrying opposed standards or supports 11, 11 and 12, 12, the standards or supports 11, 11 fitting suitable aligned guideways 13, 13 of the bedplate and adjustable toward and away from each other, suitable fastening means 14 being employed for securing the standards or supports 11 in place with respect to the bedplate. The standards 12, 12 are carried by aligned guideways 15, 15 formed on the bedplate 10 and arranged at right angles to the guideways 13, 13. The supports 11, 11 are each provided with bearings 16, 16 for the journal portions of gears 17. With this arrangement, the gears 17, 17 may be arranged in spaced parallel relation and meshing with the narrow burnishing pinions 18, 18 carried by the supports or standards 12, 12, there preferably being a pair of burnishing pinions, one for each row of the pair of rows of opposed helical teeth 19, 19. The standards 12, 12 are adjusted toward and from each other by any suitable means, for example, the feed shaft 20 having opposed threaded portions 21, 21 engaging nut portions 22, 22 carried by the standards 12, 12, the feed screw having any suitable means 23 for actuating it so that the standards 12, 12 may be caused to approach or to recede from each other to traverse the narrow burnishing pinions 18, 18 for the full length of the gear teeth 19, 19.

With the arrangement of the gears and burnishing pinions just described, it will be apparent that the burnishing pressure of the teeth of the pinions 18 with respect to the rows of teeth 19, 19 of the gears may be secured in any suitable manner, it being merely necessary to apply opposing torques to the gears for this purpose. Accordingly, in Figs. 1 and 4 one of the gears 17 is driven by means of an electric motor 25 and the other gear is connected to a loading generator 26, the motor and the generator preferably being of the direct current type and having field windings 27 and 28, respectively, provided with adjustable rheostats 29 and 30.

Energy is supplied to the motor 25 from a suitable supply line 31 through leads 32 and 33 and the commutator 34.

In like manner, the energy derived from the generator 26 is returned to the line 31 through the leads 35 and 36 and the associated slip rings 37.

By suitable adjustment of the field rheostats 29 and 30, the gearing may be loaded to secure the desired burnishing pressure, it being apparent that the regenerative connection to the line 31 makes possible the development of the necessary burnishing pressure while requiring only a relatively small amount of energy from an external source for operation of the system.

Figure 4:
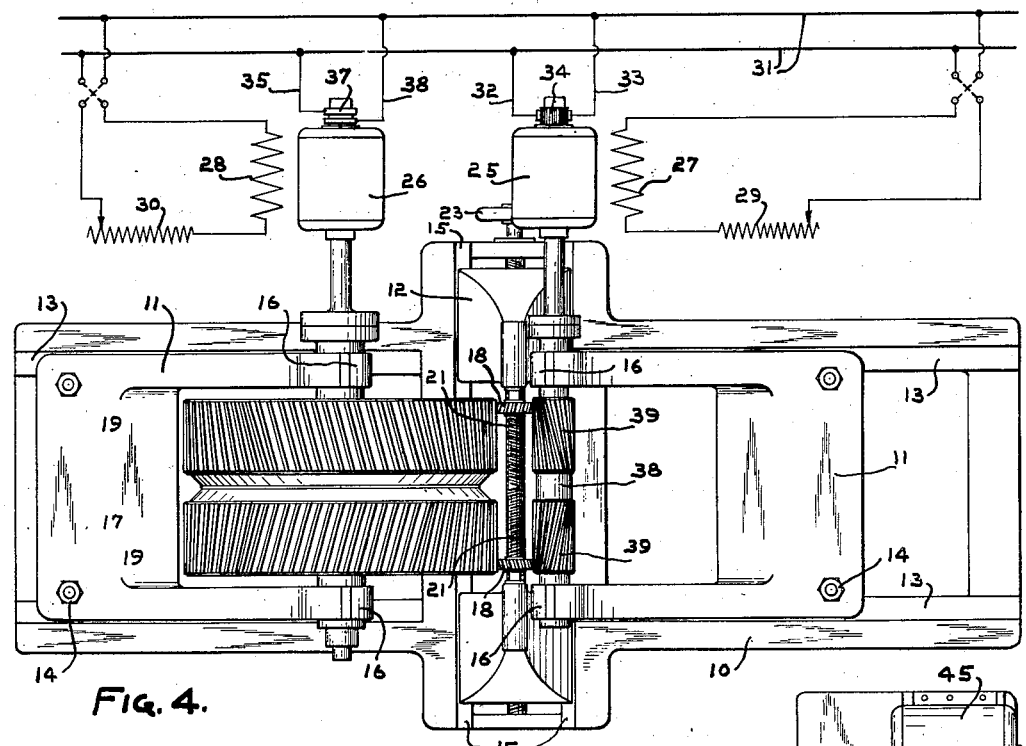
Fig. 4 is a view similar to Fig. 1 but showing the machine adjusted for a smaller gear or pinion.

The arrangement shown in Fig. 4 is similar to Fig. 1 except that, instead of the gear 17 carried by the right-hand support 11, such support is shown as carrying a pinion 38 having rows of opposed helical teeth 39, 39. Incident to burnishing a pinion and a gear, the latter are mounted on the support brackets which are suitably adjusted to bring the pinion and the gear into proper meshing relation with respect to the burnishing pinions. Obviously, the arrangement shown in Figs. 1 and 4 may also be used to effect burnishing of a pair of pinions.

Figure 5:
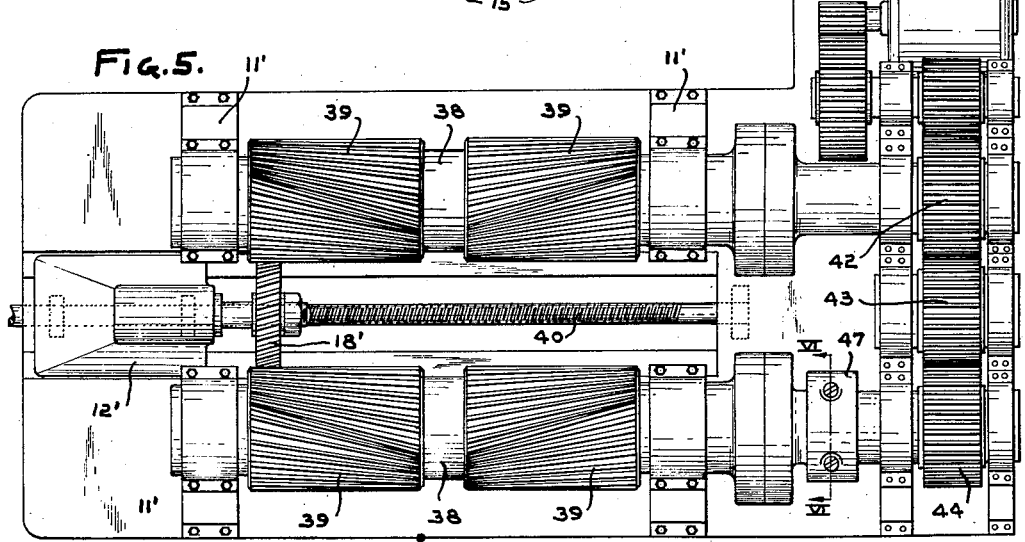
Fig. 5 shows a second embodiment of the invention.

While, in Fig. 1, the gear members are arranged in a closed transmission system, which is partly mechanical and partly electrical, the motor and the generator being connected by the line 31, the latter being also a source of energy supply for the system, and the motor and the generator having means associated therewith for adjusting the transmission system to get the desired opposed torque relation of the gear members. In Fig. 5, there is shown a second embodiment wherein the closed transmission system is entirely mechanical, being comprised by gearing, it including a coupling for securing the desired opposed torque relation and means for energizing the system including a driving motor. In this view, there are shown brackets or supports 11' adjustable toward and away from each other and carrying a pair of pinions 38 disposed in parallel relation, each pinion having rows of opposed helical teeth, 39, 39. A burnishing idler pinion 18' is carried by the support 12' arranged to be moved in a path extending at right angles to the direction of adjustment of the supports or brackets 11', the support or bracket 12' being adjusted by means of the feed screw 40. As the feed screw 40 is threaded in a single direction for the full length of the toothed portions of the pinions, it will be apparent that it must be reversed incident to movement thereof from burnishing relation with one pair of rows of helical teeth to the other pair thereof. In other words, when the burnishing pinion 18' is engaged with the right-hand pair of rows of teeth 39, the left-hand burnishing pinion is removed from its arbor, and replaced with a right-hand burnishing pinion, whereupon the helical direction of the burnishing teeth will be in proper relation to the pinion teeth.

Figure 6:
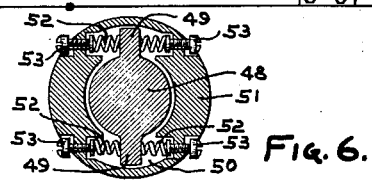
Fig. 6 is a detail sectional view taken along the line VI—VI of Fig. 5.

In Fig. 5, the parallel pinions are connected by means of a gear train including a series of gears 42, 43, and 44. The pinions may be rotated by means of a motor 45 connected by a gear train to one of said gears 42, 43 or 44, for example, the gear 42. With this arrangement, it will be apparent that the gears 42, 43 and 44, the pinions 38, 38 connected to the gears 42 and 44, and the burnishing pinion 18' meshing with the pinions 38, 38 constitute a closed transmission system and the required opposed torque relation of the pinions may be secured by means of an adjustable coupling included in the system. Accordingly, a coupling 47 is shown between the gear 44 and the lowermost pinion 38 in Fig. 5, the coupling being adjustable so that the required opposed torque relation may be secured. For example, the coupling 47 preferably includes, as shown in Fig. 6, an inner member 48 having tongues or abutments 49 disposed in recesses or chambers 50 provided in the outer member 51. Springs 52 in the chambers or recesses engage the abutments 49 and are engaged by adjustable followers 53 carried by the outer member. It will, therefore, be apparent that, by suitable adjustment of the followers 53, the desired opposed torque relation of the coupled parts may be secured and the effect thereof is transmitted to the pinion 38, 38 to bring the latter into opposed torque relation for the purpose of developing the desired burnishing pressure. Here again it will be seen that the burnishing pressure is developed somewhat as an internal stress in a closed system with the result that very little energy is required to rotate the pinions incident to burnishing.

In the embodiments described, it will be apparent that the required opposed torque relation to secure the desired burnishing pressure is provided by a closed transmission arrangement with the result that the power for burnishing motion is reduced to a minimum. After burnishing the gear teeth faces at one side, the direction of motion is reversed to effect burnishing at the other side.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a machine for burnishing a pair of toothed gear members, a frame for supporting the gear members in spaced parallel relation, a burnishing idler pinion meshing with the gear members, the length of the teeth of said idler pinion being relatively short compared to that of the teeth of said gear members, means for traversing the burnishing pinion to cause the tooth surfaces thereof to progressively engage the gear member tooth faces for the length of the latter, a closed transmission system including said gear members and the burnishing pinion, means for energizing said system to effect rotation of said gear members and the pinion, and means for adjusting said transmission system to provide for an opposed torque relation of the gear members to develop the required burnishing pressure.

2. In a machine for burnishing a pair of toothed gear members, a bedplate, a pair of first brackets carried by the bedplate and having sets of parallel bearings for supporting the gear members in spaced parallel relation, means providing for adjustment of at least one of the brackets of said pair so that the spacing and the relative positions of the latter may be varied to accommodate gear members of different sizes, a burnishing idler pinion meshing with the gear members, the length of the teeth of the idler pinion being relatively short in comparison to that of the gear member teeth, means for traversing the burnished pinion to cause the tooth faces thereof to progressively engage the gear member tooth faces for the length of the latter, a closed transmission system including said gear members and the burnishing pinion, means for energizing said system to effect rotation of said gear members and the pinion, and means for adjusting said transmission system to provide for an opposed torque relation of the gear members to develop the required burnishing pressure.

3. In a machine for burnishing a pair of toothed gear members, a bedplate, a pair of first brackets carried by the bedplate and having sets of parallel bearings for supporting the gear members in spaced parallel relation, means providing for adjustment of at least one of said brackets so that the spacing and the relative positions of the latter may be varied to accommodate gear members of different sizes, a burnishing idler pinion meshing with the gear members, the length of the teeth of the idler pinion being relatively short in comparison with that of the teeth of the gear members, means for traversing the burnishing pinion to cause the toothed faces thereof to progressively engage the gear tooth faces for the length of the latter, said last-named means including a second bracket supporting the burnishing pinion and mechanism for effecting movement of the second bracket in a direction parallel to the gear member axes, a closed transmission system including said gear members and the burnishing pinion, means for energizing said system to effect rotation of said gear members and the pinion, and means for adjusting said transmission system to provide for an opposed torque relation of the gear members to develop the required burnishing pressure.

4. In a machine for burnishing a pair of tooth gear members; a bedplate having first and second guides arranged at right angles; a pair of first brackets carried by the bedplate and adjustable along the first guides; said first brackets having sets of parallel bearings for supporting the gear members in spaced parallel relation; means for holding the first brackets in adjusted positions with respect to the bedplate; a burnishing idler pinion meshing with the gear members; the teeth of said burnishing pinion being relatively short in comparison to that of the teeth of the gear members; a second bracket carried by the bedplate, adjustable along the second guide, and carrying the burnishing pinion; means for traversing the second bracket along the second guide to cause the tooth faces of the burnishing pinion to progressively engage the gear tooth faces for the length of the latter; a closed transmission system including said gear members and the burnishing pinion, means for energizing said system to effect rotation of said gear members and the pinion, and means for adjusting said transmission system to provide for an opposed torque relation of the gear members to develop the required burnishing pressure.

5. In a machine for burnishing a pair of toothed gear members, each gear member having a pair of rows of opposed helical teeth, a frame for supporting the gear members in spaced parallel relation, a pair of burnishing idler pinions meshing with corresponding rows of teeth of the gear members, each of said idler pinions having teeth which are relatively short in comparison to that of the teeth of the gear members, means for traversing the burnishing pinions to cause the toothed faces thereof to progressively engage the gear member tooth faces throughout the length of the latter, a closed transmission system including said gear members and the burnishing pinions, means for energizing said system to effect rotation of said gear memers and the pinions, and means for adjusting said transmission system to provide for an opposed torque relation of the gear members to develop the required burnishing pressure.

6. In a machine for burnishing a pair of toothed gear members, each gear member having a pair of rows of opposed helical teeth, a frame for supporting the gear members in spaced parallel relation with the rows of teeth thereof arranged in transversely aligned pairs, a pair of burnishing idler pinions meshing with the transversely aligned rows of teeth of the gear members, the length of the teeth of each burnishing pinion being substantially shorter than that of the teeth of the rows of the gear members, means for traversing the burnishing pinions toward and away from each other to cause the toothed faces thereof to progressively engage the gear member tooth faces for the length of the latter, a closed transmission system including said gear members and the burnishing pinions, means for energizing said system to effect rotation of said gear members and the pinions, and means for adjusting said transmission system to provide for an opposed torque relation of the gear members to develop the required burnishing pressure.

7. In a machine for burnishing a pair of tooth gear members, each gear member having a pair of rows of opposed helical teeth, a bedplate, a pair of first brackets carried by the bedplate and having sets of parallel bearings for supporting the gear members in spaced parallel relation with corresponding rows of teeth thereof in transverse alignment, means providing for adjustment of at least one of said brackets so that the spacing and the relative positions thereof may be varied to accommodate gear members of different sizes, a pair of burnishing pinions meshing with the transversely aligned pairs of rows of teeth of the gear members, the length of the teeth of each burnishing pinion being relatively short in comparison to that of the gear member teeth, a pair of second brackets carried by the bedplate and supporting the burnishing pinions, means for securing simultaneous adjustment of the second brackets to cause the latter to approach or to recede from each other to cause the tooth faces of the burnishing pinions to progressively engage the gear tooth faces for the length of the latter, a closed transmission system including said gear members and the burnishing pinions, means for energizing said system to effect rotation of said gear members and pinions, and means for adjusting said transmission system to provide for an opposed torque relation of the gear members to develop the required burnishing pressure.

8. In a machine for burnishing a pair of tooth gear faces, a frame for supporting the gear members in spaced parallel relation, a narrow burnishing idler pinion meshing with the gear members, means for traversing the burnishing pinion to cause the tooth faces thereof to progressively engage the gear member tooth faces for the length of the latter, means for rotating said gear members and the burnishing pinion and including an electric motor connected to one of the gear members, and means for resisting the effort of said motor including a generator connected to the other of said gear members.

9. In a machine for burnishing a pair of tooth gear members, a frame for supporting the gear members in spaced parallel relation; a narrow burnishing idler pinion meshing with the gear members; means for traversing the burnishing pinion to cause the tooth faces thereof to progressively engage the gear member tooth faces for the length of the latter; a gear train connecting the gear members; a coupling between the gear train and one of said gear members and including a pair of members having circumferentially spaced abutments, spring means between the abutments, and means for varying the force of the spring means; and means for rotating said gear members, the connecting train of gears, and the burnishing pinion.

10. In a machine for burnishing a pair of tooth gear members; a frame for supporting the gear members in spaced parallel relation; a narrow burnishing idler pinion meshing with the gear members; means for traversing the burnishing pinion to cause the tooth faces thereof to progressively engage the gear member tooth faces for the length of the latter; a gear train connecting the gear members; a coupling between the train and one of the gear members and including a pair of members connected to the train and to said gear member, respectively, spring means cooperating with said members to exert opposed torques thereon, and means for adjusting the spring means to vary the torques; and means for rotating said gear members, the train of connecting gears and the burnishing pinion.

ARTHUR R. ALLARD.